United States Patent
Osumi et al.

(10) Patent No.: US 11,118,045 B2
(45) Date of Patent: Sep. 14, 2021

(54) PERFLUOROELASTOMER COMPOSITION AND SEALING MATERIAL

(71) Applicant: NIPPON VALQUA INDUSTRIES, LTD., Tokyo (JP)

(72) Inventors: Naoki Osumi, Gojo (JP); Kana Hirai, Gojo (JP)

(73) Assignee: VALQUA, LTD., Tokyo (JP)

( * ) Notice: Subject to any disclaimer, the term of this patent is extended or adjusted under 35 U.S.C. 154(b) by 219 days.

(21) Appl. No.: 16/304,812

(22) PCT Filed: May 24, 2017

(86) PCT No.: PCT/JP2017/019346
§ 371 (c)(1),
(2) Date: Nov. 27, 2018

(87) PCT Pub. No.: WO2017/208927
PCT Pub. Date: Dec. 7, 2017

(65) Prior Publication Data
US 2020/0317901 A1 Oct. 8, 2020

(30) Foreign Application Priority Data
May 30, 2016 (JP) .............................. JP2016-107140

(51) Int. Cl.
| C08L 29/10 | (2006.01) |
| C08K 5/01 | (2006.01) |
| C08K 5/34 | (2006.01) |
| C08L 27/12 | (2006.01) |
| C09K 3/10 | (2006.01) |
| F16J 15/10 | (2006.01) |
| C08K 5/3437 | (2006.01) |

(52) U.S. Cl.
CPC ............... *C08L 29/10* (2013.01); *C08K 5/01* (2013.01); *C08K 5/3437* (2013.01); *C08L 27/12* (2013.01); *C09K 3/1009* (2013.01); *F16J 15/10* (2013.01); *C08L 2205/02* (2013.01); *C09K 2200/0476* (2013.01); *C09K 2200/0637* (2013.01)

(58) Field of Classification Search
CPC ...... C08L 29/10; C08L 27/12; C08L 2205/02; C08K 5/3437; C08K 5/01; C09K 3/11009; C09K 2200/0476; C09K 2200/0637

USPC .......................................................... 524/90
See application file for complete search history.

(56) References Cited

U.S. PATENT DOCUMENTS

| 10,138,352 B2* | 11/2018 | Sumino ................. C08L 27/12 |
| 2004/0171714 A1 | 9/2004 | Kuzawa et al. |
| 2008/0020923 A1* | 1/2008 | Debe ................... H01M 4/8814 502/100 |
| 2010/0093898 A1 | 4/2010 | Campbell et al. |
| 2011/0086209 A1 | 4/2011 | Katayama et al. |
| 2015/0094407 A1 | 4/2015 | Murai et al. |

FOREIGN PATENT DOCUMENTS

| EP | 3 156 448 A1 | 4/2017 | |
| EP | 3156448 A1 * | 4/2017 | ............... C08K 5/01 |
| JP | 61000264 A * | 6/1985 | |
| JP | 61-254 A | 1/1986 | |
| JP | 61000254 A * | 1/1986 | |
| JP | 8-151450 A | 6/1996 | |
| JP | 2004-263038 A | 9/2004 | |
| JP | 2010-37558 A | 2/2010 | |
| JP | 2010-095578 A | 4/2010 | |
| JP | 2013-192994 A | 9/2013 | |
| JP | 2013-216771 A | 10/2013 | |
| WO | 2009/154124 A1 | 12/2009 | |
| WO | 2013/153871 A1 | 10/2013 | |
| WO | 2016/043100 A1 | 3/2016 | |
| WO | 2016/198496 A1 | 12/2016 | |

OTHER PUBLICATIONS

Office action dated Jul. 2, 2019, issued in counterpart JP application No. 2017-101791, with English translation. (8 pages).
International Search Report dated Aug. 22, 2017, issued in counterpart International Application No. PCT/JP2017/019346 (1 page).
Office Action dated Jul. 9, 2020, issued in counterpart CN Application No. 201780031648.7, with English Translation. (14 pages).

* cited by examiner

*Primary Examiner* — Michael Bernshteyn
(74) *Attorney, Agent, or Firm* — Westerman, Hattori, Daniels & Adrian, LLP

(57) ABSTRACT

Provided area perfluoroelastomer composition containing a perfluoroelastomer and a compound having a perylene skeleton, in which the compound having a perylene skeleton is a compound other than perylene and 3,4,9,10-perylenetetracarboxylic acid diimide; and a sealing material containing a crosslinked product of the perfluoroelastomer composition.

3 Claims, No Drawings

PERFLUOROELASTOMER COMPOSITION AND SEALING MATERIAL

TECHNICAL FIELD

The present invention relates to a perfluoroelastomer composition and a sealing material including the same.

BACKGROUND ART

Sealing materials (gaskets, packings, and the like) are used for various applications, and characteristics according to the applications are required. For example, when sealing materials are used under a high-temperature environment, they are required for heat resistance. When sealing materials are used under an environment in which the sealing materials are exposed to a plasma, they are required for resistance to the plasma (plasma resistance).

Meanwhile, ozone having strong oxidizing power may be used in a film forming process in producing a semiconductor device or a flat panel display. Sealing materials used in a manufacturing device using ozone are required for resistance to ozone (ozone resistance).

Japanese Patent Laying-Open No. 08-151450 (PTL 1), Japanese Patent Laying-Open No. 2004-263038 (PTL 2), and Japanese Patent Laying-Open No. 2010-037558 (PTL 3) focus attention on ozone resistance of a sealing material.

CITATION LIST

Patent Literature

PTL 1: Japanese Patent Laying-Open No. 08-151450
PTL 2: Japanese Patent Laying-Open No. 2004-263038
PTL 3: Japanese Patent Laying-Open No. 2010-037558

SUMMARY OF INVENTION

Technical Problem

The techniques described in PTLs 1 to 3 have room for improvement at least in the following points.

(1) PTL 1: Ozone resistance under a high-temperature environment is insufficient. In a fluoro-rubber molded article described in PTL 1, a filler such as an inorganic filler or the like is preferably blended from the viewpoint of reducing the blending amount of rubber while favorably maintaining ozone resistance or the like. However, the inorganic filler may cause contamination of a device to which a sealing material is applied or a product produced by using the device. That is, even when a sealing material having good ozone resistance is used, an elastomer component of the sealing material may be etched by ozone under a severe ozone environment. In this case, the inorganic filler to be blended may be scattered in the device.

(2) PTL 2: A fluoro-rubber molded article including a tetrafluoroethylene-propylene-based copolymer is disclosed. However, the tetrafluoroethylene-propylene-based copolymer contains a C—H bond in a polymer skeleton, so that it has poorer ozone resistance than that of a perfluoroelastomer.

(3) PTL 3: A fluorine-containing elastomer composition containing a specific crosslinking agent is disclosed. However, it is generally difficult to obtain the crosslinking agent.

An object of the present invention is to provide a perfluoroelastomer composition capable of being prepared by using commonly available raw materials and capable of forming a crosslinked product exhibiting good ozone resistance under a high-temperature environment even when an inorganic filler is not blended, and a sealing material including the same.

Solution to Problem

The present invention provides a perfluoroelastomer composition and a sealing material shown below.

[1] A perfluoroelastomer composition comprising:
a perfluoroelastomer; and
a compound having a perylene skeleton,
wherein
the compound having a perylene skeleton is a compound other than perylene and 3,4,9,10-perylenetetracarboxylic acid diimide.

[2] The perfluoroelastomer composition according to [1], wherein the compound having a perylene skeleton is represented by a formula (1) below:

[Chemical formula 1]

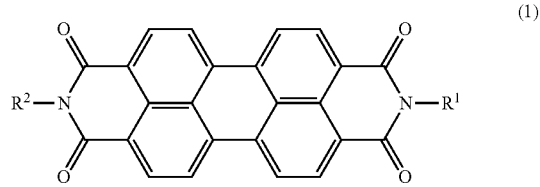

(1)

wherein $R^1$ and $R^2$ each independently represent an optionally substituted alkyl group, alkoxy group or aryl group.

[3] The perfluoroelastomer composition according to [1] or [2] wherein a content of the compound having a perylene skeleton is greater than or equal to 0.05 parts by weight and less than 2 parts by weight with respect to 100 parts by weight of the perfluoroelastomer.

[4] The perfluoroelastomer composition according to any one of [1] to [3], wherein the perfluoroelastomer does not contain an inorganic filler.

[5] A sealing material comprising a crosslinked product of the perfluoroelastomer composition according to ally one of [1] to [4].

Advantageous Effects of Invention

The present invention can provide a perfluoroelastomer composition capable of forming a crosslinked product exhibiting good ozone resistance under a high-temperature environment even when an inorganic filler is not blended, and a sealing material including the perfluoroelastomer composition.

DESCRIPTION OF EMBODIMENTS

<Perfluoroelastomer Composition>
[a] Perfluoroelastomer

A perfluoroelastomer is not particularly limited, and examples thereof include a tetrafluoroethylene (TFE)-perfluoro (alkyl vinyl ether)-based copolymer and a TFE-perfluoro (alkoxyalkyl vinyl ether)-based copolymer. These copolymers may further contain a constituent unit derived from another perfluoromonomer. A perfluoroelastomer composition containing the perfluoroelastomer can have higher ozone resistance than that of a composition containing a hydrogen atom-containing fluoroelastomer. The perfluoroelastomer composition may contain only one or two or more of the perfluoroelastomers.

A perfluoro (alkyl vinyl ether) forming the tetrafluoroethylene (TFE)-perfluoro (alkyl vinyl ether)-based copolymer can have an alkyl group having 1 to 5 carbon atoms, and example thereof include perfluoro (methyl vinyl ether), perfluoro (ethyl vinyl ether), and perfluoro (propyl vinyl ether). Perfluoro (methyl vinyl ether) is preferable.

A perfluoro (alkoxyalkyl vinyl ether) forming the TFE-perfluoro (alkoxyalkyl vinyl ether)-based copolymer can have a group that is bonded to a vinyl ether group ($CF_2=CFO-$) and that has 3 to 12 carbon atoms, and examples thereof include:

$CF_2=CFOCF_2CF(CF_3)OC_nF_{2n+1}$, 

$CF_2=CFO(CF_2)_3OC_nF_{2n+1}$, 

$CF_2=CFOCF_2CF(CF_3)O(CF_2O)_mC_nF_{2n+1}$, or 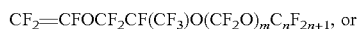

$CF_2=CFO(CF_2)_2OC_nF_{2n+1}$. 

In the formula, n is for example 1 to 5, and m is for example 1 to 3.

The perfluoroelastomer preferably has crosslinkability. More specifically, the perfluoroelastomer is preferably obtained by further copolymerizing a crosslinking site monomer (the perfluoroelastomer further contains a constituent unit derived from a crosslinking site monomer). The crosslinking site means a site capable of being crosslinked. Examples of the crosslinking site include a nitrile group, halogen groups (for example, an I group, a Br group, and the like), and a perfluorophenyl group.

One example of the crosslinking site monomer having a nitrile group as the crosslinking site is a nitrile group-containing perfluorovinyl ether. Examples of the nitrile group-containing perfluorovinyl ether include:

$CF_2=CFO(CF_2)_nOCF(CF_3)CN$ (n is for example 2 to 4), 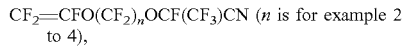

$CF_2=CFO(CF_2)_nCN$ (n is for example 2 to 12), 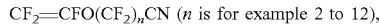

$CF_2=CFO[CF_2CF(CF_3)O]_m(CF_2)_nCN$ (n is 2, m is for example 1 to 5), 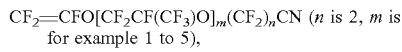

$CF_2=CFO[CF_2CF(CF_3)O]_m(CF_2)_nCN$ (n is for example 1 to 4, m is for example 1 to 2), and 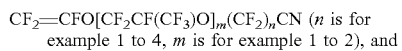

$CF_2=CFO[CF_2CF(CF_3)O]_nCF_2CF(CF_3)CN$ (n is for example 0 to 4). 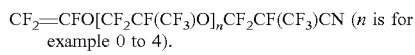

An example of the crosslinking site monomer having a halogen group as the crosslinking site is a halogen group-containing perfluorovinyl ether. Examples of the halogen group-containing perfluorovinyl ether include those in which the nitrile group is replaced with a halogen group in the specific examples of the nitrile group-containing perfluorovinyl ether.

A crosslinkable perfluoroelastomer may have a crosslinking structure crosslinking two main chains.

The molar ratio of the constituent unit derived from TFE in the perfluoroelastomer/the constituent unit derived from the perfluoro (alkyl vinyl ether) or the perfluoro (alkoxyalkyl vinyl ether)/the constituent unit derived from the crosslinking site monomer is usually 50 to 74.8%/25 to 49.8%/0.2 to 5%, and preferably 60 to 74.8%/25 to 39.5%/0.5 to 2%. The perfluoroelastomer composition of the present invention may contain two or more perfluoroelastomers having different ratios of the constitutional units.

[b] Compound Having Perylene Skeleton

The perfluoroelastomer composition contains a compound having a perylene skeleton (hereinafter also referred to as a "perylene-based compound"). This makes it possible to improve ozone resistance under a high-temperature environment. The perylene-based compound is not particularly limited as long as it is a compound other than perylene and 3,4,9,10-perylenetetracarboxylic acid diimide. Specific examples of the perylene-based compound usable in the present invention include the following compounds. The perfluoroelastomer composition may contain only one or two or more of the perylene-based compounds.

(1) A compound represented by the following formula (1):

[Chemical formula 2]

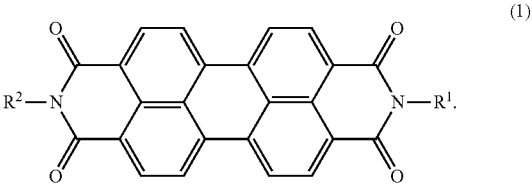

(1)

In the formula (1), $R^1$ and $R^2$ each independently represent an optionally substituted alkyl group, alkoxy group or aryl group.

(2) A compound represented by the following formula (2);

[Chemical formula 3]

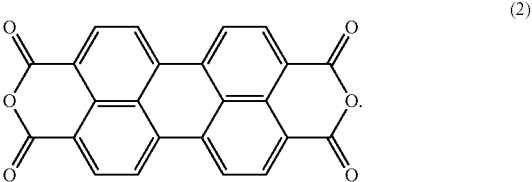

(2)

The perylene-based compound preferably contains a compound represented by the formula (1).

Examples of the alkyl group which may constitute $R^1$ and $R^2$ in the formula (1) include linear alkyl groups having 1 to 20 carbon atoms (preferably 1 to 6 carbon atoms) such as a methyl group, an ethyl group, a propyl group, a butyl group, a pentyl group, and a hexyl group; and branched alkyl groups having 3 to 20 carbon atoms (preferably 3 to 8 carbon atoms) such as an isopropyl group, an isobutyl group, a sec-butyl group, a tert-butyl group, an isopentyl group, a neopentyl group, and a 2-ethylhexyl group.

Examples of the substituent which may be included in the alkyl group include a halogen group (fluorine, chlorine, bromine, or iodine). The substituent may be an aryl group. That is, $R^1$ and $R^2$ may be each independently an aralkyl group. Examples of the aralkyl group include a benzyl group, a phenylethyl group, a phenylpropyl group, a 2-methylphenylmethyl group, a 3-methylphenylmethyl group, a 4-methylphenylmethyl group, a 2,3-dimethylphenylmethyl group, a 2,4-dimethylphenymethyl group, a 2,5-dimethylphenylmethyl group, a 2,6-dimethylphenylmethyl group, a 3,4-dimethylphenylmethyl group, and a naphthylmethyl group. Substituents such as a methoxy group may be present on the aromatic ring of the aryl group.

Examples of the alkoxy group which may constitute $R^1$ and $R^2$ include a group in which an oxygen atom is bonded to the alkyl group. More typical examples thereof include a methoxy group, an ethoxy group, a propoxy group, an isopropoxy group, and a butoxy group. Examples of the substituent which may be included in the alkoxy group are the same as the substituent which may be included in the alkyl group.

Examples of the aryl group which may constitute $R^1$ and $R^2$ include a phenyl group and a naphthyl group. The aryl group is preferably a phenyl group. Examples of the substituent which may be included in the aryl group include a halogen group (fluorine, chlorine, bromine, or iodine) and an alkyl group. Specific examples of the alkyl group are the same as the specific examples of the alkyl group above.

The perylene-based compound may be a compound known as an organic pigment. For example, C.I. Pigment Red 123 (a compound wherein $R^1=R^2=$an ethoxy group in the formula (1)); C.I. Pigment Red 149 (a compound wherein $R^1=R^2=$a 3,5-dimethylphenyl group in the formula (1)); C.I. Pigment Red 178 (a compound wherein $R^1=R^2=$a 4-(phenylazo)phenyl group in the formula (1)); C.I. Pigment Red 179 (a compound wherein $R^1=R^2=$a methyl group in the formula (1)); C.I. Pigment Red 190 (a compound wherein $R^1=R^2=$a methoxy group in the formula (1)); C.I. Pigment Black 31 (a compound wherein $R^1=R^2=$a phenylethyl group in the formula (1)); and C.I. Pigment Black 32 (a compound wherein $R^1=R^2=$a 4-methoxyphenylethyl group in the formula (1)) or the like can be used as the compound represented by the formula (1).

As the compound represented by the formula (2), C.I. pigment red 224 can be used.

From the viewpoint of effectively improving ozone resistance under a high-temperature environment, the content of the perylene-based compound (the total amount when two or more thereof are used) in the perfluoroelastomer composition is preferably greater than or equal to 0.05 parts by weight and less than 2 parts by weight, more preferably greater than or equal to 0.05 parts by weight and less than or equal to 1.8 parts by weight, still more preferably greater than or equal to 0.05 parts by weight and less than or equal to 1.5 parts by weight, and yet still more preferably greater than or equal to 0.05 parts by weight and less than or equal to 1.3 parts by weight (for example, greater than or equal to 0.05 parts by weight and less than or equal to 1.1 parts by weight), with respect to 100 parts by weight of the perfluoroelastomer.

[c] Crosslinking Agent

The perfluoroelastomer composition may contain a crosslinking agent depending on the crosslinking system of the perfluoroelastomer. The crosslinking system of the perfluoroelastomer may be, for example, a peroxide crosslinking system, a triazine crosslinking system, an oxazole crosslinking system, an imidazole crosslinking system, a thiazole crosslinking system, or the like. Preferably, the crosslinking system is a peroxide crosslinking system. Only one crosslinking agent may be used, or two or more of the crosslinking agents may be used in combination.

The peroxide crosslinking agent (radical polymerization initiator) used in the peroxide crosslinking system may be, for example, 2,5-dimethyl-2,5-di(t-butylperoxy)hexane (commercially available example: "Perhexa 25B" manufactured by NOF Corporation); dicumyl peroxide (commercially available example: "Percumyl D" manufactured by NOF Corporation); 2,4-dichlorobenzoyl peroxide; di-t-butyl peroxide; t-butyl dicumyl peroxide; benzoyl peroxide (commercially available example: "Nyper B" manufactured by NOF Corporation); 2,5-dimethyl-2,5-(t-butylperoxy) hexyne-3 (commercially available example: "Perhexin 25B" manufactured by NOF Corporation); 2,5-dimethyl-2,5-di (benzoylperoxy)hexane, α,α'-bis(t-butylperoxy-m-isopropyl)benzene (commercially available example: "Perbutyl P" manufactured by NOF Corporation); t-butyl peroxyisopropyl carbonate; parachlorobenzoyl peroxide, or the like.

In the peroxide crosslinking system, a co-crosslinking agent can be used together with the peroxide crosslinking agent. Examples of the co-crosslinking agent include compounds capable of being co-crosslinked by radicals such as triallyl isocyanurate (commercially available example: "TAIC" manufactured by Nihon Kasei Co., Ltd.); triallyl cyanurate; triallyl formal; triallyl trimellitate; N,N'-m-phenylene bismaleimide; dipropargyl terephthalate; diallyl phthalate; and tetraallyl terephthalamide (unsaturated polyfunctional compounds). Only one co-crosslinking agent may be used, or two or more of the co-crosslinking agents may be used in combination. Among the above, from the viewpoint of improving reactivity and compression set characteristics under a high-temperature environment (an index of a lifetime when used under a high-temperature environment), the co-crosslinking agent preferably contains triallyl isocyanurate.

Another preferable example of the co-crosslinking agent is a diolefin compound represented by the following formula (3):

$$CH_2=CH-(CF_2)_n-CH=CH_2 \quad (3)$$

n in the formula (3) is preferably an integer of 4 to 12, and more preferably an integer of 4 to 8. The triallyl isocyanurate or the like may be used in combination with the diolefin compound. The fact that the co-crosslinking agent contains the diolefin compound is advantageous for obtaining a crosslinked product with improved compression set characteristics under a high-temperature environment.

Examples of the crosslinking agent used in the oxazole crosslinking system include 2,2-bis(3-amino-4-hydroxyphenyl)hexafluoropropane (BOAP); 4,4'-sulfonyibis(2-aminophenol)[bis(3-amino-4-hydroxyphenyl)sulfone], 3,3'-diaminobenzidine, and 3,3',4,4'-tetraaminobenzophenone. BOAP is preferably used.

In the triazine crosslinking system, a crosslinking catalyst such as an organotin compound, a quaternary phosphonium salt, urea, or silicon nitride is used.

The content of the crosslinking agent (the total amount when two or more thereof are used) in the perfluoroelastomer composition is, for example, 0.01 to 20 parts by weight with respect to 100 parts by weight of the perfluoroelastomer, and from the viewpoint of improving ozone resistance and compression set characteristics under a high-temperature environment, the content is preferably less than or equal to 10 parts by weight, and more preferably less than or equal to 5 parts by weight.

The content of the co-crosslinking agent (the total amount when two or more thereof are used) in the perfluoroelastomer composition is, for example, 0.1 to 40 parts by weight with respect to 100 parts by weight of the perfluoroelastomer, and from the viewpoint of improving ozone resistance and compression set characteristics under a high-temperature environment, the content is preferably 0.2 to 10 parts by weight.

[d] Other Blending Agents

For the purpose of improving processability and controlling physical properties, the perfluoroelastomer composition can contain additives such as an anti-aging agent, an anti-oxidant agent, a vulcanization accelerator, a processing aid (stearic acid or the like), a stabilizer, a tackifier, a silage coupling agent, a plasticizer, a flame retardant agent, a mold release agent, a wax, and a lubricant, if necessary. Another example of the additives is a tackiness reducing (preventing) agent such as a fluorine-based oil (for example, perfluoroether or the like). Only one additive may be used, or two or more of the additives may be used in combination.

However, volatilization, elution, or deposition may occur when the sealing material is used in a high-temperature environment, and therefore, the amount of the additive is as small as possible (for example, less than or equal to 10 parts by weight, preferably less than or equal to 5 parts by weight, more preferably less than or equal to 2 parts by weight, and still more preferably less than or equal to 1 part by weight, with respect to 100 parts by weight of the perfluoroelastomer), and it is desirable that no additive is contained.

The perfluoroelastomer composition may contain inorganic fillers such as carbon black, silica, alumina, zinc oxide, titanium oxide, clay, talc, diatomaceous earth, barium sulfate, calcium carbonate, magnesium carbonate, calcium oxide, mica, graphite, aluminum hydroxide, aluminum silicate, hydrotalcite, a metal powder, a glass powder, and a ceramic powder, if necessary.

However, the inorganic filler may be scattered under a severe ozone environment as described above, and therefore, the amount of the inorganic filler is preferably as small as possible (for example, less than or equal to 10 parts by weight, preferably less than or equal to 5 parts by weight, more preferably less than or equal to 2 parts by weight, and still more preferably less than or equal to 1 part by weight, with respect to 100 parts by weight of the perfluoroelastomer), and it is desirable that no inorganic filler is blended. The inorganic filler refers to a filler containing a metal element (Ba, Ti, Zn, Al, Mg, Ca, Si or the like).

The perfluoroelastomer composition may further contain a fluororesin. Thus, the ozone resistance and mechanical strength of the crosslinked product of the perfluoroelastomer composition can be further improved. The form of the fluororesin is not particularly limited, but the fluororesin can be contained as fluororesin particles, for example, in the perfluoroelastomer composition.

The fluororesin is a resin having a fluorine atom in the molecule thereof. Examples of the fluororesin include polytetrafluoroethylene (PTFE), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polychlorotrifluoroethylene (PCTFE), a chlorotrifluoroethylene-ethylene copolymer (ECTFE), poly vinylidene fluoride (PVDF) polyvinyl fluoride (PNT), a vinylidene fluoride-hexafluoropropylene copolymer (a VDF-HFP copolymer), and a vinylidene fluoride-hexafluoropropylene-tetrafluoroethylene copolymer (a VDF-HFP-TFE copolymer). Only one fluororesin may be used, or two or more of the fluororesins may be used m combination.

Among the above-mentioned compounds, from the viewpoint of preventing the impairment of characteristics such as compression set caused by the melting of the resin under a high-temperature environment, fluororesins having a relatively high melting point such as PFA and PTFE are preferably used.

The fluororesin may contain a functional group. The functional group can be introduced, for example, by copolymerizing a monomer having the functional group. When the aforementioned crosslinking site monomer is copolymerized as the monomer having a functional group, the crosslinking agent also causes the crosslinking of the fluororesin and the perfluoroelastomer to proceed, so that the mechanical strength or the like of the crosslinked product of the perfluoroelastomer composition can be further improved. Examples of the fluororesin in having a functional group include nitrile group-containing polytetrafluoroethylene described in Japanese Patent Laying-Open No. 2013-177631.

The fluororesin may also be a modified fluororesin such as "TFM modified PTFE" (manufactured by Dyneon).

When the fluororesin is used, the content of the fluororesin in the perfluoroelastomer composition (the total amount when two or more of the fluororesins are used) is preferably 1 to 100 parts by weight, and more preferably 5 to 50 parts by weight, with respect to 100 parts by weight of the perfluoroelastomer, from the viewpoint of effectively improving the mechanical strength or the like of the crosslinked product. When the content of the fluororesin is excessively large, the content of the perfluoroelastomer exhibiting elasticity is relatively decreased, which causes deteriorated compression set characteristics.

[e] Preparation of Perfluoroelastomer Composition

The perfluoroelastomer composition can be prepared by uniformly kneading a perfluoroelastomer, a perylene-based compound, a crosslinking agent or a crosslinking agent and a co-crosslinking agent, or a crosslinking catalyst), and other blending agent added if necessary. As a kneading machine, for example, conventionally known kneading machines such as mixing rollers (such as an open roll) and mixers (such as a kneader and a Banbury mixer) can be used. These blending agents may be mixed and kneaded in one step. Alternatively, all these blending agents may be kneaded in several steps in such a manner that some of the blending agents are kneaded and subsequently the remainders of the blending agents are kneaded.

As for the kneading of the perfluoroelastomer with the fluororesin, for example, the following methods can be used: 1) a method in which a powder of the perfluoroelastomer is kneaded with a powder of the fluororesin with a mixing roll; 2) a method in which a powder or pellet of the perfluoroelastomer is melt-kneaded with a powder or pellet of the fluororesin with a device such as a mixer or a twin-screw extruder; and 3) a method in which the fluororesin is added during the step of preparing the perfluoroelastomer.

An example of the method 3) includes a method in which an aqueous dispersion of the perfluoroelastomer and an aqueous dispersion of the fluororesin both prepared by an emulsion polymerization method are mixed together and then the resultant mixture is co-coagulated to produce a mixture of the perfluoroelastomer and the fluororesin.

<Sealing Material>

A crosslinked molded product such as a sealing material can be produced by the crosslinking and molding (vulcanization molding) of the perfluoroelastomer composition. That is, the sealing material is composed of a crosslinked product of the perfluoroelastomer composition. The crosslinking and molding can be carried out by pre-molding the perfluoroelastomer composition if necessary and then press-molding the pre-molded product using a mold. The molding temperature is for example about 150 to 220° C. The molding may be carried out by feed press molding, injection molding, extrusion molding or the like. If necessary, secondary crosslinking may be carried out at a temperature of about 150 to 320° C.

After the step of carrying out crosslinking and molding (press molding) as described above, there may be provided a step of irradiating the molded product with an ionizing radiation to cause the crosslinking in the molded product. Thus, the compression set characteristics can be further improved. As the ionizing radiation, an electron beam or γ-ray can be preferably used.

The sealing material can be a packing, a gasket or the like. The shape of the sealing material is appropriately selected depending on the intended use thereof, and a typical example thereof is an O-ring having an O-shaped cross section. The sealing material according to the present invention exhibits good ozone resistance and compression set characteristics even under a high-temperature environment, so that it can be suitably used as a sealing material for maintaining the degree of vacuum in a device using ozone under a high-temperature environment, such as a device used in a film forming process in producing a semiconductor device or a flat panel display.

Example 10, Comparative Example 2: two steps of press molding condition 165° C. for 10 minutes; secondary crosslinking condition 150° C. for 7 hours, and then 300° C. for 4 hours.

Example 11, Comparative Example 3: press molding condition 188° C. for 15 minutes; second crosslinking condition 250° C. for 24 hours.

TABLE 1

| | | Examples | | | | | | | | | | | Comparative Examples | | |
|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| Perfluoroelastomer | FFKM 1 (Elastomer component) | 100 | 100 | 100 | 100 | 100 | 100 | 100 | 100 | 100 | | 100 | 100 | | |
| | FFKM 2 | | | | | | | | | | 100 | | | 100 | |
| | FFKM 3 (Elastomer component) | | | | | | | | | | | | | | 93 | 93 |
| | FFKM 4 (Derived component) | | | | | | | | | | | | | | 7 | 7 |
| Fluororesin | Fluororesin 1 (Derived from FFKM 1) | 11 | 11 | 11 | 11 | 11 | 11 | 11 | 11 | 11 | | 11 | | | |
| | Fluoropolymer 3 (Derived from FFKM 3) | | | | | | | | | | | | | | 23 | 23 |
| Crosslinking agent | | 1 | 1 | 1 | 1 | 1 | 1 | 2 | 2 | 1 | | 1 | | | |
| Co-crosslinking agent (Derived from FFKM 1) | | 2 | 2 | 2 | 2 | 2 | 2 | 2 | 2 | 2 | | 2 | | | |
| Ttiazine catalyst 1 | | | | | | | | | | | 1 | | 1 | | |
| Ttiazine catalyst 2 | | | | | | | | | | | | 2 | | | 2 |
| Carbon black | | | | | | | | | | | 15 | | | 15 | |
| Silion | | | | | | | | | | | | 2 | | | 2 |
| Perylene-based compound | A | 0.1 | | 0.3 | 0.6 | 0.1 | 0.3 | 0.1 | 0.3 | 1.1 | | 0.4 | | | |
| | B | | 0.1 | | | | | | | | 0.3 | | | | |
| Ozone resistance | Weight loss rate (%) | 1.10 | 1.09 | 1.01 | 0.98 | 1.02 | 1.01 | 1.15 | 1.18 | 1.19 | 1.79 | 1.12 | 1.27 | 1.88 | 1.22 |
| | Compression set (200° C., 72 h) | 20 | 20 | 23 | 24 | 23 | 25 | 26 | 24 | 31 | 11 | 16 | 18 | 8 | 18 |
| | Compression set (260° C., 72 h) | 49 | 53 | 50 | 55 | 54 | 53 | 52 | 55 | 59 | 9 | 43 | 63 | 10 | 47 |

EXAMPLES

Hereinafter, the present invention will be described in more detail with reference to Examples and Comparative Examples; however, the present invention is not intended to be limited thereto.

Examples 1 to 11, Comparative Examples 1 to 3

A perfluoroelastomer composition was prepared and then a sealing material was produced in accordance with the following procedure. First, according to the blending compositions shown in Table 1 (the unit for each of the blending amounts in Table 1 is part(s) by weight), predetermined amounts of blending agents were kneaded with an open roll. Next, the resultant perfluoroelastomer composition was press-molded under the following condition, and then subjected to secondary crosslinking by heat under the following condition to obtain a sealing material (O ring).

Examples 1 to 9, Comparative Example 1: press molding condition 165° C. for 20 minutes; second crosslinking condition 230° C. for 16 hours, The details of the blending agents used in Examples and Comparative Examples above are as follows.

[1] FFKM 1: a composition containing a perfluoroelastomer which tetrafluoroethylene-perfluoro (alkyl vinyl ether)-iodine atom-containing perfluoro (alkyl vinyl ether) copolymer, a co-crosslinking agent represented by the formula (3), and polytetrafluoroethylene particles ("Tecnoflon PFR5910M" manufactured by Solvay Specialty Polymers Co., Ltd.). In Table 1 the content (parts by weight) of a perfluoroelastomer contained in FFKM 1 is shown in the column of "FFKM 1"; the content (parts by weight) of a fluororesin contained in FFKM 1 is shown in the column of "Fluororesin 1"; and the content (parts by weight) of a co-crosslinking agent represented by the formula (3) contained in FFKM 1 is shown in the column of "Co-crosslinking agent".

[2] FFKM 2: a perfluoroelastomer ("PFE 191TZ" manufactured by 3M Company).

[3] FFKM 3: a composition containing a perfluoroelastomer and a fluororesin ("PFE 133TBZ" manufactured by 3M Company). In Table 1, the content (parts by weight) of a perfluoroelastomer contained in FFKM 3 is shown in the column of "FFKM 3", and the content (parts by weight) of a fluororesin contained in FFKM 3 is shown in the column of "Fluororesin 3".

[4] FFKM 4: a composition containing a perfluoroelastomer and a triazine catalyst ["PFE 01CZ" manufactured by 3M Company]. In Table 1, the content (parts by weight) of a perfluoroelastomer contained in FFKM 4 is shown in the column of "FFKM 4", and the content (parts by weight) of a triazine catalyst contained in FFKM 4 is shown in the column of "Triazine catalyst 2".

press-molded under the following condition, and then subjected to secondary crosslinking by heat under the following condition to obtain a sealing material (O ring).

Press molding condition 165° C. for 20 minutes; second crosslinking condition 230° C. for 16 hours

TABLE 2

|  |  | Examples | | Comparative Examples | | | |
|---|---|---|---|---|---|---|---|
|  |  | 12 | 13 | 4 | 5 | 6 | 7 |
| Perfluoroelastomer | FFKM 1 (Elastomer component) | 100 | 100 | 100 | 100 | 100 | 100 |
| Fluororesin | Fluororesin 1 (Derived from FFKM 1) | 11 | 11 | 11 | 11 | 11 | 11 |
| Crosslinking agent | | 1 | 1 | 1 | 1 | 1 | 1 |
| Crosslinking agent (Derived from FFKM 1) | | 2 | 2 | 2 | 2 | 2 | 2 |
| Perylene-based compound A | | | | 0.05 | 2.0 | 5.0 | 10.0 | 20.0 |
| C | | 0.3 | | | | | |
| Ozone resistance | Weight loss rate (%) | 1.06 | 0.95 | 1.63 | 2.29 | 3.09 | 3.54 |
| | Compression set (200° C., 72 h) | 32 | 29 | 33 | 43 | 59 | 66 |
| | Compression set (260° C., 72 h) | 56 | 49 | 55 | 66 | 84 | 91 |

[5] Crosslinking agent: 2,5-dimethyl-2,5-di(t-butylperoxy) hexane ("Perhexa 25B" manufactured by NOF Corporation).
[6] Triazine catalyst 1: "PFE 300C" manufactured by 3M Company.
[7] Carbon black: N-990 MT.
[8] "Aerosil R972" manufactured by Nippon Aerosil Co., Ltd.
[9] Perylene-based compound A: C.I. Pigment Red 149 (a compound wherein $R^1=R^2=$a 3,5-dimethyl phenyl group in the formula (1)).
[10] Perylene-based compound B: C.I. Pigment Red 178 (a compound wherein $R^1=R^2=$a 4-(phenylazo)phenyl group in the formula (1)).

(Evaluation of Sealing Materials)

As for the obtained crosslinked molded products (sealing materials), the following items were measured and evaluated. The results are shown in Table 1.

[1] Evaluation of Ozone Resistance

An ozone exposure test was conducted, in which the sealing material was placed under an environment of an ozone concentration of 200 g/m$^3$ and a temperature of 160° C. for 72 hours. The weight of the sealing material before and after the test was measured, and a weight reduction rate was calculated according to the following formula:

weight loss rate(%)={(weight before test−weight after test/(weight before test)}×100.

[2] Compression Set of Sealing Material

In accordance with JIS K6262, an O ring having a wire diameter ϕ of 3.53 was used for the measurement of the compression set of each of the sealing materials under conditions of 200° C. for 72 hours and at a compression ratio of 25%, and 260° C. for 72 hours and at a compression ratio of 25%.

Examples 12 to 13, Comparative Examples 4 to 7

A perfluoroelastomer composition was prepared and then a sealing material was produced in accordance with the following procedure. First, according to the blending compositions shown in Table 2 (the unit for each of the blending amounts in Table 2 is part(s) by weight), predetermined amounts of blending agents were kneaded with an open roll. Next, the resultant perfluoroelastomer composition was The details of the blending agents used in Examples and Comparative Examples above are as follows.

[1] FFKM 1: a composition containing a perfluoroelastomer which is a tetrafluoroethylene-perfluoro (alkyl vinyl ether)-iodine atom-containing perfluoro (alkyl vinyl ether) copolymer, a co-crosslinking agent represented by the formula (3), and polytetrafluoroethylene particles ("Tecnoflon PFR5910M" manufactured by Solvay Specialty Polymers Co., Ltd.). In Table 2, the content (parts by weight) of a perfluoroelastomer contained in FFKM 1 is shown in the column of "FFKM 1"; the content (parts by weight) of a fluororesin contained in FFKM 1 is shown in the column of "Fluororesin 1"; and the content (parts by weight) of a co-crosslinking agent represented by the formula (3) contained in FFKM 1 is shown in the column of "Co-crosslinking agent".

[2] Crosslinking agent: 2,5-dimethyl-2,5-di(t-butylperoxy) hexane ("Perhexa 25B" manufactured by NOF Corporation).

[3] Perylene-based compound A: C.I. Pigment Red 119 (a compound wherein $R^1=R^2=$a 3,5-dimethyl phenyl group in the formula (1)).

[4] Perylene-based compound C: C.I. Pigment Red 179 (a compound wherein $R^1=R^2=$a methyl group in the formula (1)).

(Evaluation of Sealing Materials)

The ozone resistance and compression set of each of the resultant crosslinked molded products (sealing materials) were measured and evaluated in the same manner as in Examples 1 to 11 and Comparative Examples 1 to 3. The results are shown in Table 2.

The invention claimed is:

1. A perfluoroelastomer composition comprising:
   a perfluoroelastomer; and
   a compound having a perylene skeleton selected from the group consisting of

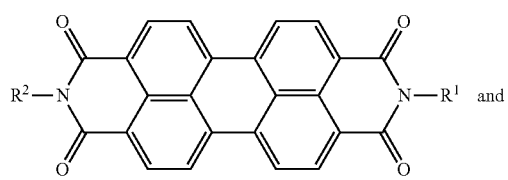
(1)

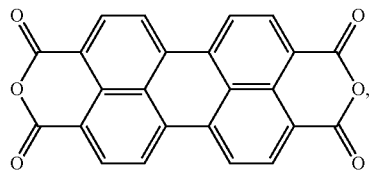
(2)

wherein $R^1$ and $R^2$ each independently represent an optionally substituted alkyl group, alkoxy group or aryl group, and a content of the compound having a perylene skeleton is greater than or equal to 0.05 parts by weight and less than or equal to 0.4 parts by weight with respect to 100 parts by weight of the perfluoroelastomer.

2. The perfluoroelastomer composition according to claim 1, wherein the perfluoroelastomer does not contain an inorganic filler.

3. A sealing material comprising a crosslinked product of the perfluoroelastomer composition according to claim 1.

\* \* \* \* \*